Aug. 24, 1965  W. ROOS  3,202,046
TELESCOPIC SPECTACLES
Filed April 26, 1962
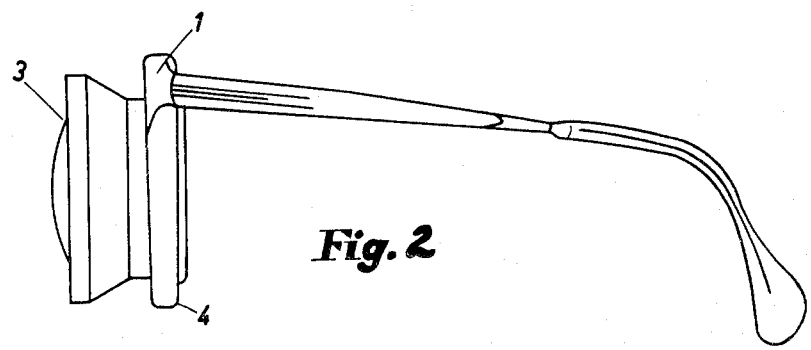
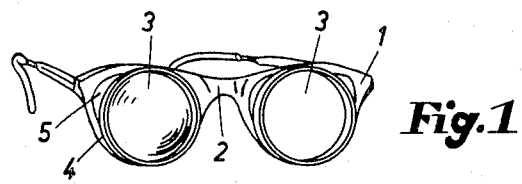
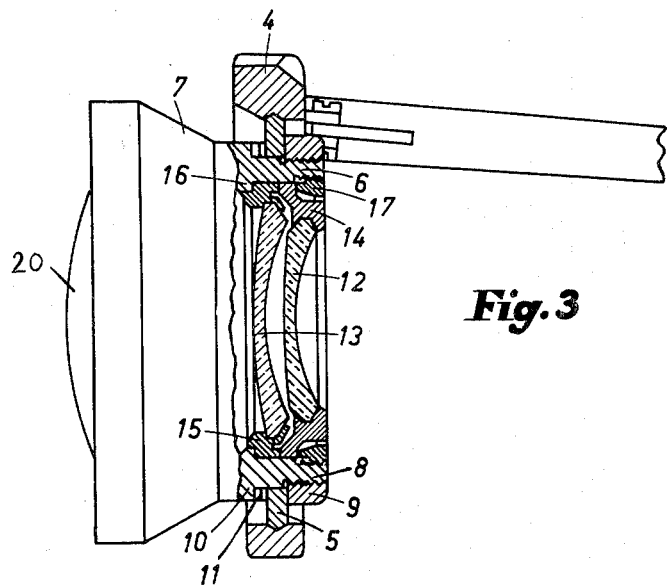
INVENTOR:
Wolfgang Roos,
BY Singer, Stern & Carlberg,
ATTORNEYS United States Patent Office 3,202,046
Patented Aug. 24, 1965

3,202,046
TELESCOPIC SPECTACLES
Wolfgang Roos, Oberkochen, Wurttemberg, Germany, assignor to Carl Zeiss, Wurttemberg, Germany
Filed Apr. 26, 1962, Ser. No. 190,279
Claims priority, application Germany, May 6, 1961, Z 8,725
1 Claim. (Cl. 88—34)

This invention relates to improvements in telescopic spectacles and particularly is directed to telescopic spectacles for ametropic eyes.

The telescopic spectacles used heretofore employ one or two telescopes with an objective and ocular arranged in a spectacle frame. Since the users of telescopic spectacles mostly are not only amblyopic but also ametropic, they require in addition to an enlarging telescope also means for correcting the deficiency of sight. The lenses employed for this purpose are spherical and/or cylindrical depending upon the type of deficiency of sight.

It has been proposed heretofore to attach the lenses producing the required spheric-cylindrical effect for compensating the deficiency of sight to the oculars on that side of the telescopic spectacles which faces the eyes. It is, however, not economical to keep such slip-on lenses for every type and degree of deficiency of sight in stock and therefore the slip-on lenses have to be made individually in accordance with specifically determined prescriptions.

It is an object of the invention to produce telescopic spectacles which permit the compensation of different deficiencies of sight in an economical manner and with means which are easy to manipulate.

In accordance with the invention the oculars of telescopic spectacles for ametropic eyes consist of two members of which one may serve at the same time for spherical correction and the other for cylindrical correction. These two members of an ocular consist preferably of two menisci-shaped individual lenses the concave faces of which are directed toward the eye.

In accordance with another object of the invention the two members of the ocular are provided with mounting rings and may be individually inserted into the telescopic tube mount and may be exchanged for other lenses of a different spherical or cylindrical effect. In this manner a pair of telescopic spectacles is provided in which each one of a number of spherical correcting members may be combined with each one of a number of cylindrical correcting members and in doing this, the quality of the viewing is maintained.

The advantage of the telescopic spectacles of the invention can best be illustrated by a numerical example: If for the spherical correction (in farsightedness or shortsightedness) a range of —30.0 to + 25.0 diopter with steps of 0.5 diopter and for the cylindrical correction (in astigmatism) a range of 0.0 to 6.0 diopter in steps of 0.25 diopter has to be considered, then there will result 111×25=2775 possible combinations. While in the heretofore employed telescopic spectacles provided with a fixed ocular for the compensation of all kinds and degrees of deficiency of sight 2774 different slip-on lenses are required, it is sufficient when in accordance with the present invention only one of 111 different spherical lenses is combined with one of 25 different cylindrical lenses in order to serve as ocular members for the telescopic spectacles. These 136 different lenses can be held available without difficulty so that it is no longer necessary to make correction lenses in accordance with a prescription.

Further objects and advantages of the invention will be described in detail with reference to the accompanying drawing, the figures of which illustrate by way of example one embodiment of the telescopic spectacles of the invention.

In the drawings:

FIG. 1 is a perspective view of the telescopic spectacles of the invention;

FIG. 2 is a side elevation view;

FIG. 3 illustrates in an enlarged view a portion of FIG. 2 and a section of the ocular portion of the telescope.

Referring to the drawing, the frame 1 of the telescopic spectacles is provided on both sides of the bridge 2 with a telescope 3 having an objective lens 20 and an ocular 12, 13. As particularly illustrated in FIG. 3, the mounting ring 4 of the frame 1 has arranged therein an annular disc 5 which may, for instance, consist of transparent plastic and which serves as a carrier for the optical system. This annular disc 5 surrounds, as shown, the end 6 of the telescope tube 7 which contains the ocular 12, 13. The telescope tube 7 is provided on its end 6 with an exterior thread 8 which has attached thereto an interiorly threaded ring 9 which engages one side of the annular disc 5 and urges the other side against a ring 11 made of elastic material which is urged against a shoulder 10 on the exterior of the telescope tube 7.

Each ocular consists in accordance with the invention of two members 12 and 13. One of these members, namely the member 12 which is closest to the eye of the wearer of the spectacles, may serve for the cylindrical correction, while the member 13, which faces the objective lens 20, may serve for spherical correction. Both members 12 and 13 are meniscus-shaped individual lenses the concave faces of which are directed toward the eye.

The ocular members 12 and 13 are mounted in their own mounting rings 14 and 15. The mounting ring 15 engages an annular shoulder 16 within the tube 7, while the mounting ring 14 engages the mounting ring 15 and is held in position by an exteriorly threaded locking ring 17 which engages a corresponding interior thread in the tube 7.

When the locking ring 17 is removed from the tube 7, the ocular members 12 and 13 may be removed together with their mounting rings 14 and 15 from the tube 7 and may be exchanged independently of one another by correcting lenses of different diopter. Therefore, the telescopic spectacles of the invention can easily be adjusted to any changes in the deficiencies of the eyes. A change of the correcting lenses is, for instance, necessary when a change in the farsightedness or shortsightedness of the eyes of the wearer should occur. In such a case the ocular member 13 is exchanged by a stronger spherical correcting member, while the cylindrical member may remain unchanged.

The construction of the spectacles as shown in FIG. 3 makes it clear that the azimuthal angle of the cylindrical correcting member may easily be readjusted, and that the distance of the members 12 and 13 from one another and from the objective 20 may easily be varied by merely changing the shape and/or the thickness, respectively, of the mounting rings 14 and 15.

What I claim is:

In telescopic spectacles, a spectacle frame having spaced supporting rings connected by a nose bridge, a tubular mount in each of said supporting rings, an objective and an ocular in each of said tubular mounts, said tubular mounts being provided with an internal rearwardly facing annular shoulder, each ocular consisting of two meniscus-shaped individual lenses having their concave faces directed toward the eye, mount rings for each of said meniscus-shaped lenses with the mount rings of the lenses adjacent said objectives seated on said annular shoulder in each of said tubular mounts, the mount ring remote from said objective being engaged with the first named mount ring to support said meniscus-shaped individual lenses in spaced relation, a retaining ring mounted within each of said tubular mounts to lock said lens rings in position and urge the same into engagement with said shoulder, one of said meniscus-shaped individual lenses in each of said oculars producing spherical correction and the other meniscus-shaped lens in each ocular producing cylindrical correction, the ocular lens producing the cylindrical correction being positioned closest to the eye.

References Cited by the Examiner

UNITED STATES PATENTS

| | | | |
|---|---|---|---|
| 408,725 | 8/89 | Kornblum et al. | 88—32 |
| 940,895 | 11/09 | Von Rohr | 88—57 |
| 2,087,235 | 7/37 | Ames et al. | 88—54 |

OTHER REFERENCES

Special Aids to Sub-Normal Vision, Kollmorgen Optical Corporation, Bulletin No. 301, received in U.S. Patent Office Sept. 20, 1955, p. 4.

JEWELL H. PEDERSEN, *Primary Examiner.*